United States Patent
Bang et al.

(10) Patent No.: US 10,241,348 B2
(45) Date of Patent: Mar. 26, 2019

(54) ACTUATOR DRIVING APPARATUS AND CAMERA MODULE INCLUDING THE SAME

(71) Applicant: SAMSUNG ELECTRO-MECHANICS CO., LTD., Suwon-si (KR)

(72) Inventors: Je Hyun Bang, Suwon-si (KR); Byung Gi An, Suwon-si (KR); Hoon Heo, Suwon-si (KR); Shin Young Cheong, Suwon-si (KR); Dae Hyun Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/210,046

(22) Filed: Jul. 14, 2016

(65) Prior Publication Data

US 2017/0160557 A1 Jun. 8, 2017

(30) Foreign Application Priority Data

Dec. 7, 2015 (KR) .......................... 10-2015-0173432

(51) Int. Cl.
  *G03B 5/00* (2006.01)
  *G02B 27/64* (2006.01)
  *G03B 13/36* (2006.01)

(52) U.S. Cl.
  CPC ............ *G02B 27/646* (2013.01); *G03B 5/00* (2013.01); *G03B 13/36* (2013.01); *G03B 2205/0069* (2013.01)

(58) Field of Classification Search
  None
  See application file for complete search history.

(56) References Cited

U.S. PATENT DOCUMENTS

| | | | |
|---|---|---|---|
| 2010/0080545 A1* | 4/2010 | Fan ........................ | G03B 5/02 396/55 |
| 2012/0008929 A1* | 1/2012 | David ................... | G01D 5/145 396/125 |
| 2013/0043740 A1* | 2/2013 | Xu ..................... | B60R 25/02153 310/12.04 |
| 2013/0321937 A1 | 12/2013 | Baik et al. | |
| 2015/0212293 A1 | 7/2015 | Bang et al. | |

(Continued)

FOREIGN PATENT DOCUMENTS

| | | |
|---|---|---|
| CN | 102262280 A | 11/2011 |
| CN | 103501402 A | 1/2014 |

(Continued)

OTHER PUBLICATIONS

Translation of Mizumura, JP 2010-151986.*

(Continued)

*Primary Examiner* — Noam Reisner
(74) *Attorney, Agent, or Firm* — NSIP Law

(57) ABSTRACT

An actuator and a camera module including the same are provided. The actuator driving apparatus includes a detector configured to apply a reference signal to a driving coil of an actuator and detect a coil current flowing in the driving coil, a calculator configured to determine a position of a lens carrier based on the coil current, and a driver configured to drive the actuator based on the position of the lens carrier and a position control signal.

15 Claims, 5 Drawing Sheets

(56) References Cited

U.S. PATENT DOCUMENTS

| | | | | |
|---|---|---|---|---|
| 2016/0142634 A1* | 5/2016 | You | ....................... | G03B 29/00 |
| | | | | 348/208.2 |
| 2016/0195794 A1* | 7/2016 | Zhao | ....................... | G03B 3/10 |
| | | | | 348/335 |
| 2016/0258736 A1* | 9/2016 | Bachar | ................. | H04N 5/2254 |
| 2018/0278853 A1 | 9/2018 | Ryu et al. | | |

FOREIGN PATENT DOCUMENTS

| | | |
|---|---|---|
| CN | 104253940 A | 12/2014 |
| CN | 104267480 A | 1/2015 |
| CN | 204331242 U | 5/2015 |
| CN | 108668056 A | 10/2018 |
| JP | 2010-151986 A | 7/2010 |
| KR | 10-2013-0077216 A | 7/2013 |
| KR | 10-2013-0077217 A | 7/2013 |
| KR | 10-1332043 B1 | 11/2013 |
| KR | 10-1337975 B1 | 12/2013 |

OTHER PUBLICATIONS

Korean Office Action dated Oct. 25, 2016, in counterpart of Korean Application No. 10-2015-0173432 (5 pages in English, 5 pages in Korean).

Chinese Office Action dated Dec. 12, 2018 in corresponding Chinese Patent Application No. 201610670026.6 (12 pages in English and 9 pages in Chinese).

\* cited by examiner

I-I'

ACTUATOR DRIVING APPARATUS AND CAMERA MODULE INCLUDING THE SAME

CROSS-REFERENCE TO RELATED APPLICATION(S)

This application claims the benefit under 35 USC 119(a) of Korean Patent Application No. 10-2015-0173432 filed on Dec. 7, 2015, in the Korean Intellectual Property Office, the entire disclosure of which is incorporated herein by reference for all purposes.

BACKGROUND

1. Field

The following description relates to an actuator driving apparatus and a camera module including the same.

2. Description of Related Art

A camera module mounted in an electronic device generally includes a lens barrel including a lens therein, a lens carrier holding the lens barrel, a housing accommodating the lens carrier therein, and an image sensor converting an image of a subject into an electric signal. A single focus-type camera module that captures images of a subject with a fixed focus may be used in an electronic device. However, with the recent development of imaging technology, a camera module that includes an actuator for auto-focus operation is often used in electronic devices. In addition, a camera module may include an actuator for optical image stabilization (OIS) in order to ameliorate a resolution reduction resulting from the instability of the camera module while images are taken.

An actuator driving apparatus may be used to drive the above-mentioned actuators. The actuator driving apparatus may detect a position of the lens carrier and drive the actuator based on the detected position of the lens carrier and a position control signal in order to move the lens carrier to a target position.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator driving apparatus includes a detector configured to apply a reference signal to a driving coil of an actuator and detect a coil current flowing in the driving coil, a calculator configured to determine a position of a lens carrier based on the coil current, and a driver configured to drive the actuator based on the position of the lens carrier and a position control signal.

The reference signal may be a square wave voltage signal.

The detector may be configured to sense the coil current before the coil current is in a steady state.

Inductance of the driving coil may be changed depending on the position of the lens carrier.

The detector may be configured to detect the coil current from which an offset current of a control signal for driving the actuator is removed.

The calculator may be configured to calculate inductance of the driving coil based on the coil current, and output position information of the lens carrier corresponding to the inductance to the driver.

In another general aspect, a camera module includes a lens carrier disposed in a housing, a magnetic body that moves with the lens carrier, an actuator including a driving coil disposed in the housing to face the magnetic body, the actuator being configured to receive a control signal to move the lens carrier, and an actuator driving apparatus configured to drive the actuator. The actuator driving apparatus includes a detector that applies a reference signal to the driving coil and detects a coil current flowing in the driving coil, a calculator that determines a position of the lens carrier based on the coil current, and a driver that drives the actuator based on the position of the lens carrier and a position control signal.

The reference signal may be a square wave voltage signal.

The detector may be configured to sense the coil current before the coil current is in a steady state.

Inductance of the driving coil may be changed depending on the position of the lens carrier.

The detector may be configured to detect the coil current from which an offset current of a control signal for driving the actuator is removed.

The calculator may be configured to calculate inductance of the driving coil based on the coil current, and output position information of the lens carrier corresponding to the inductance to the driver.

The actuator may include a voice coil motor (VCM).

In yet another general aspect, an actuator driving apparatus includes a detection circuit configured to apply a reference signal to a driving coil of an actuator and detect a coil current flowing in the driving coil, and a driver configured to drive the actuator by outputting an actuator control signal based on a position of a lens carrier as determined based on the coil current.

The general aspect of the actuator driving apparatus further includes a calculation circuit configured to calculate the position of the lens carrier based on the coil current detected by the detection circuit.

The driver may be configured to receive a position control signal from an external source and generate the actuator control signal based on the position of the lens carrier as determined by the coil current and the position control signal.

The detection circuit and the driver may include a single integrated circuit or two or more integrated circuits.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
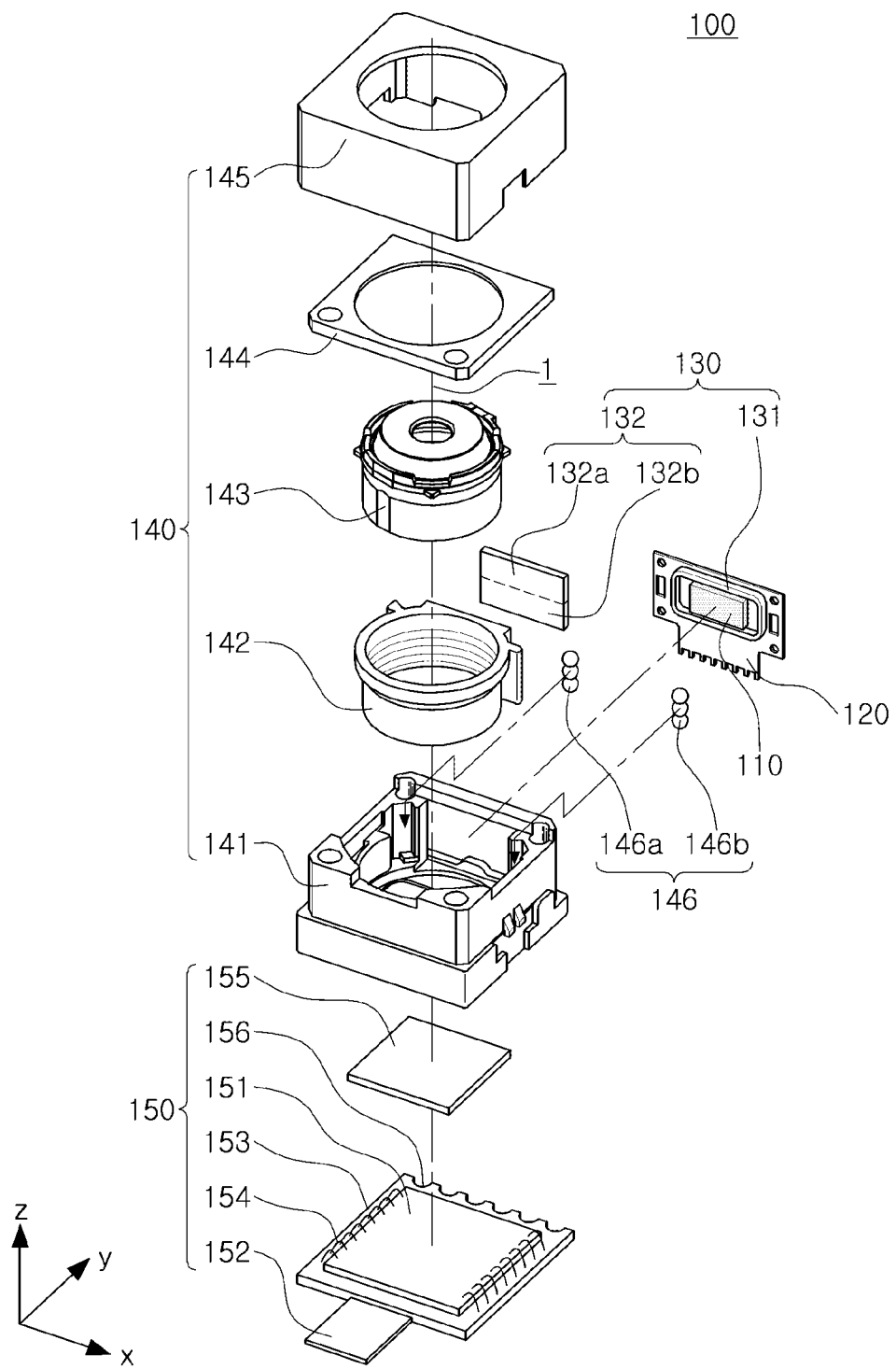
FIG. 1 is an exploded perspective diagram illustrating an example of a camera module including an actuator driving apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples will be described as follows with reference to the attached drawings.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening therebetween cannot be present. Like numerals refer to like elements throughout. As used herein, the term "and/or" includes any and all combinations of one or more of the associated listed items.

Although terms such as "first," "second," and "third" may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in examples below may also be referred to as a second member, component, region, layer or section without departing from the teachings of the examples.

Spatially relative terms such as "above," "upper," "below," and "lower" may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprise," and "have" specify the presence of stated features, numbers, operations, members, elements, and/or combinations thereof, but do not preclude the presence or addition of one or more other features, operations, members, elements, and/or combinations thereof.

Hereinafter, examples will be described with reference to schematic diagrams. In the drawings, due to manufacturing techniques and/or tolerances, for example, modifications of the shape shown may result. Thus, the examples described herein are not to be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

According to one example, an actuator driving apparatus capable of accurately driving an actuator by determining a position of a lens carrier based on a change in a coil current flowing in a driving coil is provided inside a camera module.

Before describing such an actuator driving apparatus in detail, an overall structure of an example of a camera module including an actuator driving apparatus will be first described with reference to FIGS. 1 through 3.

Figure 2:
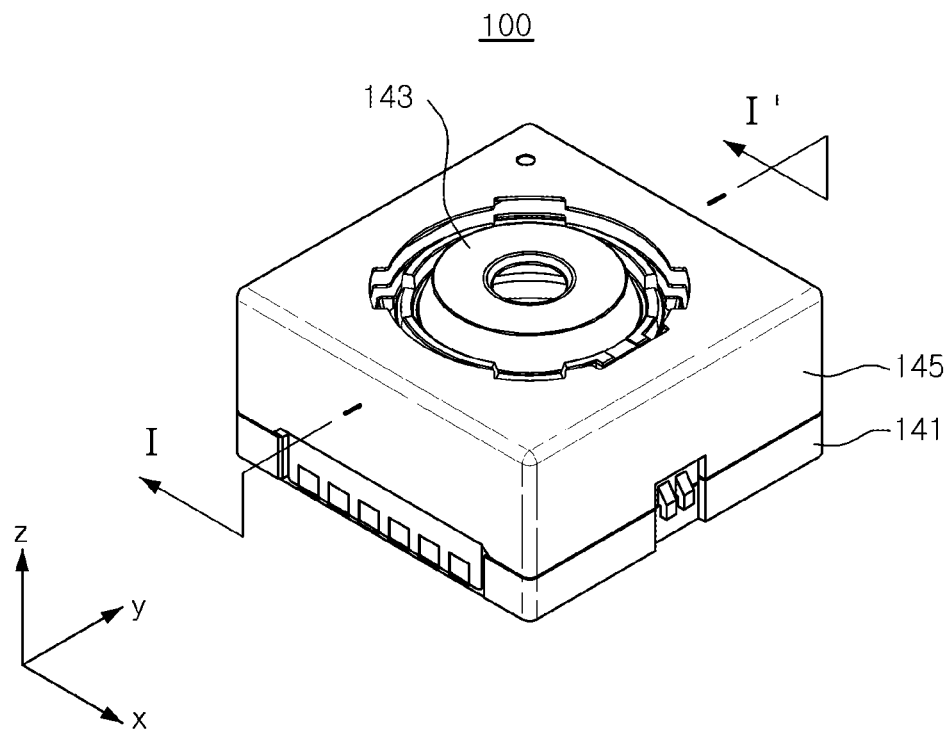
FIG. 2 is an assembled perspective diagram illustrating an example of the camera module illustrated in FIG. 1.
Figure 3:
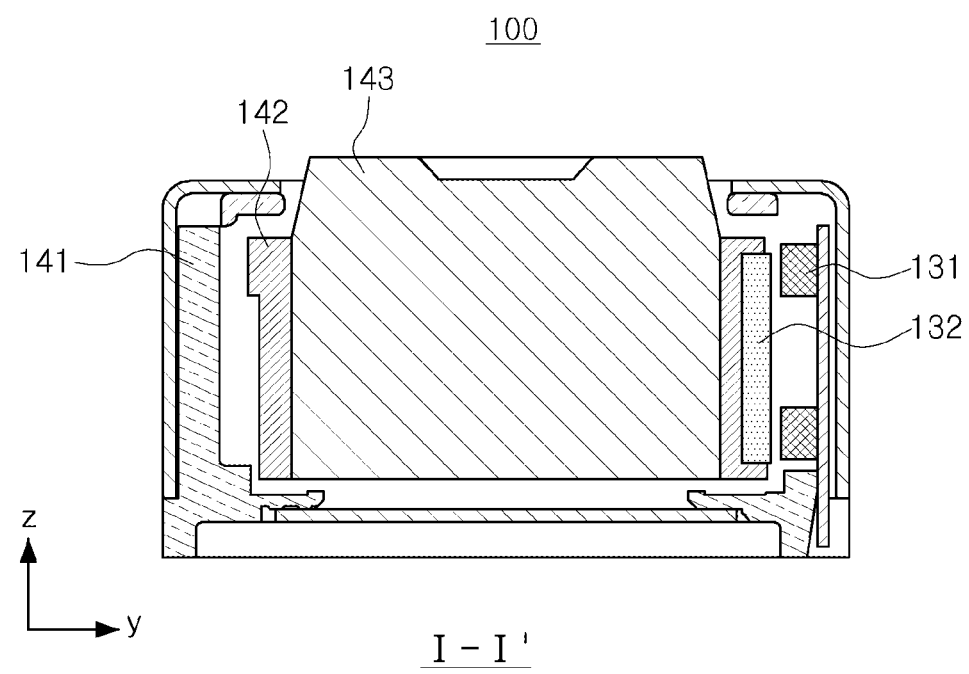
FIG. 3 is a cross-sectional diagram of the camera module illustrated in FIG. 1.

For conciseness of the description, an example of a camera module 100 that includes one actuator for an auto-focus function is illustrated in FIGS. 1 through 3. However, in another example, a camera module 100 may include a plurality of actuators in order to provide an optical image stabilization function that compensates for the shaking of the camera module 100 while images are being captured.

FIG. 1 illustrates an exploded perspective diagram of an example of the camera module including an actuator driving apparatus, and FIG. 2 illustrates an assembled perspective diagram of the camera module according to the example illustrated in FIG. 1.

Referring to FIGS. 1 and 2, the camera module 100 includes an actuator driving apparatus 110, an actuator 130, a lens module 140, and an image sensor module 150.

The actuator driving apparatus 110 may determine a position of a lens carrier 142 and output a control signal for driving the actuator 130 based on the position of the lens carrier 142 and a position control signal from an external source. The external source may be, for example, an application installed on the electronic device in which the camera module 100 is installed. However, the external source is not limited thereto. Referring to FIG. 1, the actuator driving apparatus 110 is disposed on a surface of a board 120 disposed peripheral to the lens barrel 143.

FIG. 1 illustrates an example in which the actuator driving apparatus 110 is disposed in a central region of a driving coil 131. However, in another example, the actuator driving apparatus 110 may be positioned in another location.

The actuator driving apparatus 110 may apply a reference signal to the driving coil 131 of the actuator 130 and detect a coil current that is flowing in the driving coil 131, in order to determine the position of the lens carrier 142.

The operation and configuration of the actuator driving apparatus 110 will be further described below with reference to FIGS. 5 through 7.

The actuator 130 may receive the control signal from the actuator driving apparatus 110 and generate a driving force capable of moving the lens carrier 142 in an optical axis (1) direction based on the control signal.

To generate the driving force, the actuator 130 may include one of a rotation motor, a piezo actuator, and a voice coil motor, but is not limited thereto. Hereinafter, an actuator 130 that includes a voice coil motor will be described as an example.

In this example, the actuator 130 includes the driving coil 131 and a magnetic body 132.

The driving coil 131 is disposed on a surface of the board 120. The board 120 on which the driving coil 131 is disposed may be a printed circuit board. In addition, the board 120 is disposed on a side surface of a housing 141. In this example, the driving coil 131 is disposed along a circumference of the actuator driving apparatus 110.

The magnetic body 132 is attached to the lens carrier 142 to face the driving coil 131.

In this example, the control signal from the actuator driving apparatus 110 may be supplied to the driving coil 131 included in the actuator 130 to form an electric field, and the electric field may interact with a magnetic field of the magnetic body 132, thereby generating a driving force that moves the lens carrier 142 in the optical axis (1) direction according to Fleming's left hand rule.

The magnetic body 132 may react with the magnetic field generated when a current flows in the driving coil 131, thereby generating the driving force.

Further, the magnetic body 132 may include first and second magnetic bodies 132*a* and 132*b*. The first and second magnetic bodies 132*a* and 132*b* may be formed by polarization of the magnetic body 132, such that the movement of the lens carrier 142 may be easily controlled.

The lens module 140 includes the housing 141, and the housing accommodates the lens carrier 142 having a lens barrel 143 disposed therein, a stopper 144 restricting movement of the lens carrier 142 in the optical axis (1) direction, and a shield case 145 enclosing the housing 141.

In the lens barrel 143, at least one lens may be assembled by an adhesive method or a screw-coupling method.

A set of ball bearings 146 are disposed in one or more internal guides of the housing 141 to support movement of the lens carrier 142 in the optical axis direction by rolling motion. In addition, the set of ball bearings 146 are further divided into a first group of ball bearings 146*a* and a second group of ball bearings 146*b*, and the first and second group of ball bearings 146*a*, 146*b* are respectively disposed in two internal guides of the housing 141. A lubricant may be applied on surfaces of the ball bearings 146.

An image sensor module 150 is disposed below the housing 141 and includes an image sensor 151, a flexible printed circuit 152, and a circuit board 153. The image sensor 151 is disposed on an image formation surface and mounted on one surface of the circuit board 153 by a wire bonding 154. The flexible printed circuit 152 extends from the circuit board 153 to thereby be connected to an internal circuit of an electronic apparatus to be described below such as a camera, a mobile communications terminal, or the like. A coupling part 156 coupled to the board 120 is provided at one end portion of the circuit board 153. In addition, in this example, the image sensor module 150 further includes an IR filter 155 that filters an incident image, and the filtered image is provided to the image sensor 151.

FIG. 3 is a cross-sectional diagram of the camera module according to the example illustrated in FIG. 1.

Referring to FIG. 3, the magnetic body 132 is attached to a side surface of the lens carrier 142 that accommodates the lens barrel 143 therein.

Further, the driving coil 131 is disposed in the housing 141 facing one side surface of the lens carrier 142.

Figure 4A:
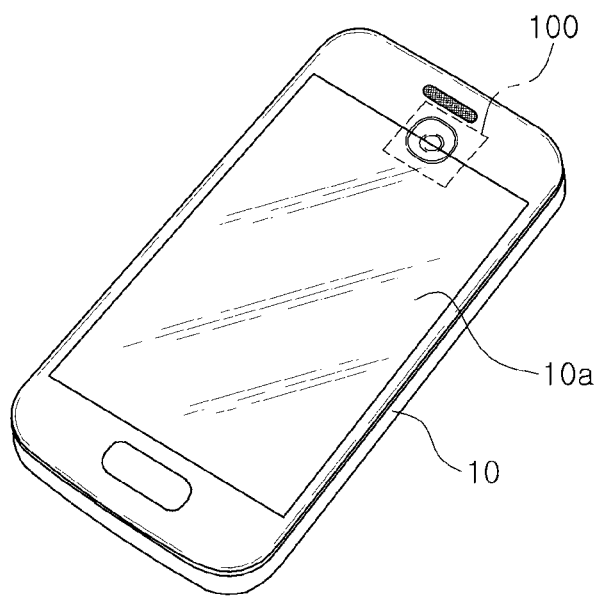
FIGS. 4A and 4B are schematic diagrams illustrating an exterior of an electronic apparatus including an example of a camera module.
Figure 4B:
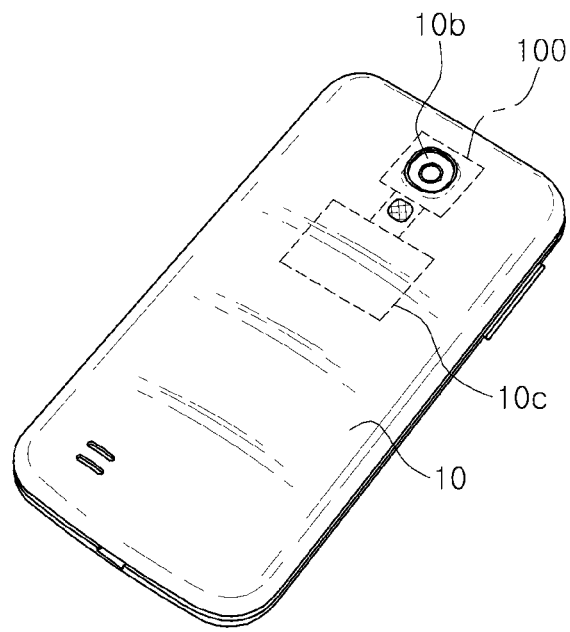

FIGS. 4A and 4B illustrate an exterior of an example of an electronic apparatus that includes a camera module.

Referring to FIGS. 4A and 4B, an electronic apparatus 10 according to this example includes a camera module 100. A lens of the camera module 100 is exposed through an opening 10*b* provided in a housing of the electronic apparatus 10 to thereby capture an image of an external subject.

In this example, the camera module 100 is electrically connected to a control part 10*c* of the electronic apparatus 10 to perform a control operation based on user selection.

Although not illustrated in FIG. 4B, the control part 10*c* may include an application integrated circuit (IC) outputting a position control signal to an actuator driving apparatus.

Figure 5:
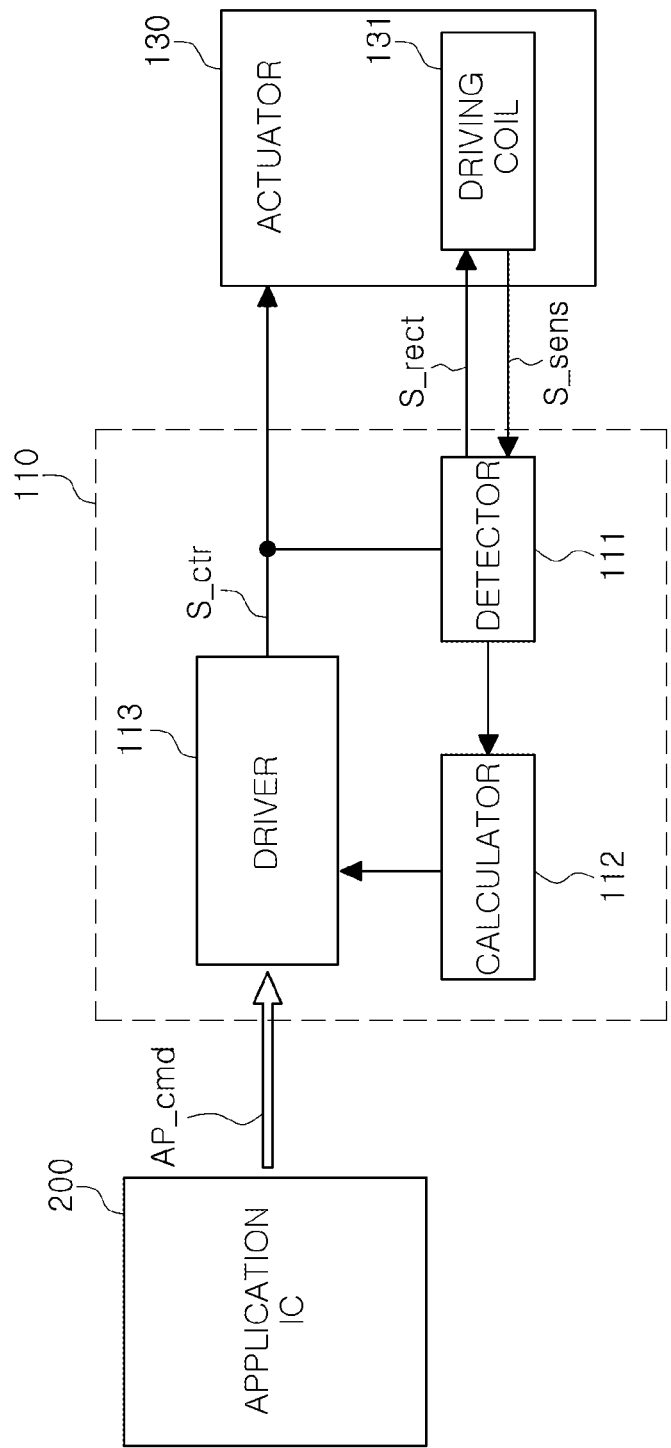
FIG. 5 is a block diagram illustrating an example of an actuator driving apparatus.

FIG. 5 illustrates a configuration of an example of an actuator driving apparatus.

Referring to FIG. 5, an actuator driving apparatus 110 includes a detector 111, a calculator 112, and a driver 113.

The detector 111, the calculator 112, and the driver 113 may be configured as a single integrated circuit, or configured as two or more integrated circuits. According to one example, the detector 111, the calculator 112, and the driver 113 may be characterized as a detection circuit, a calculation circuit, and a driver circuit.

The single integrated circuit may be implemented, for example, by a combination of hardware such as a microprocessor, or the like, and software provided in the hardware and programmed to control a predetermined operation.

The hardware may include at least one processing unit. The processing unit may include, for example, a central processing unit (CPU), a microprocessor, an application specific integrated circuit (ASIC), field programmable gate arrays (FPGA), or the like, and may have a plurality of cores.

Hereinafter, an operation of an example of an actuator driving apparatus 110 will be described in sequence in accordance with a flow of a signal from the detector 111.

Referring to FIG. 5, the detector 111 applies a reference signal S_rect to the driving coil 131 and detects the coil current (S_sens) that is flowing in the driving coil 131. As illustrated in FIG. 1, the driving coil 131 is disposed to face the magnetic body 132. Thus, the magnetic field of the magnetic body that affects the driving coil 131 may be changed depending on a change in a position of the magnetic body. The change in the magnetic field as described above may cause a change in inductance of the driving coil 131, and a level of the coil current that is flowing in the driving coil 131 may be changed due to the change in inductance.

That is, the inductance of the driving coil is changed based on the position of the lens carrier, and thus, the level of the coil current is changed.

Further, the detector 111 detects the coil current from which an offset current formed in the driving coil 131 by the control signal S_ctr for driving the actuator 130 is removed. To this end, the detector 111 receives the control signal S_ctr from the driver 113.

Meanwhile, the detector 111 applies the reference signal S_rect, a square wave voltage signal, to the driving coil 131.

The calculator 112 determines the position of the lens carrier 142 (in FIG. 1) based on the coil current, and outputs position information of the lens carrier to the driver 113. For example, the calculator 112 may determine the position of the lens carrier based on the level of the coil current using mapping data pre-stored in a memory (not illustrated). In addition, the calculator 112 may calculate inductance based on a voltage level of the reference signal S_rect and a current level of the coil current, and may output position information of the lens carrier corresponding to the calculated inductance to the driver 113.

The memory may be formed of a non-volatile memory, and the non-volatile memory may be a flash memory, an electrically erasable programmable read-only memory (EE-PROM), or a ferroelectric random access memory (Fe-RAM).

The driver 113 may drive the actuator based on the position information of the lens carrier input from the calculator 112 and a position control signal Ap_cmd. The position control signal Ap_cmd may be input from the application IC 200.

For example, the position control signal Ap_cmd input to the actuator driving apparatus 110 may include position information indicating a target position of the lens carrier desired to be moved by the user, that is, target displacement of the lens carrier.

The driver 113 may compensate for the position control signal Ap_cmd using the position of the lens carrier. Thereafter, the driver 113 outputs a control signal S_ctr for driving the actuator based on the compensated position control signal Ap_cmd.

According to one example, the driver 113 may be an H bridge driver capable of performing bi-directional driving.

Figure 6:
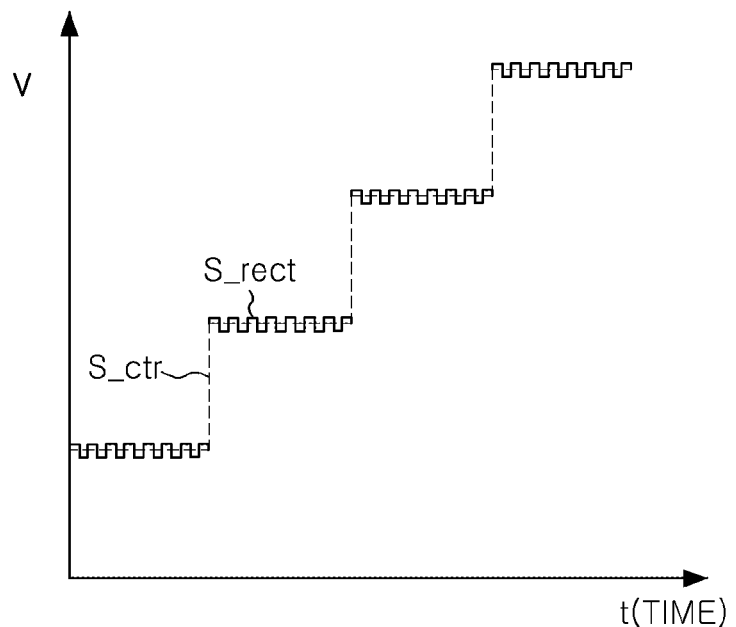
FIG. 6 is a waveform diagram illustrating an example of a control signal and a reference signal.

FIG. 6 is a waveform diagram illustrating a control signal and a reference signal according to an example of an actuator driving apparatus.

In this example, the control signal S_ctr output by the driver 113 illustrated in FIG. 5 may be a voltage signal having a step waveform. However, the waveform of the voltage signal output by the driver 113 is not limited thereto. For example, the control signal S_ctr may be converted into a current signal to thereby be input to the actuator 130 illustrated in FIG. 5, and the control signal S_ctr may have a ramp or linear waveform.

In response to receiving the control signal S_ctr, the actuator may generate a driving force that is capable of changing a position of the lens carrier 142 (in FIG. 1) as described above.

Referring to FIG. 6, it may be confirmed that the reference signal S_rect, the square wave voltage signal applied to the driving coil 131 (in FIG. 5) by the detector 111 (in FIG. 5), is combined with the control signal S_ctr to thereby be applied to the driving coil 131 (in FIG. 5). In this example, the reference signal S_rect may have an amplitude smaller than a voltage level of the control signal S_ctr to significantly decrease an influence on the actuator generating the driving force.

Therefore, in addition to the coil current by the reference signal S_rect, the offset current formed in the driving coil 131 by the control signal S_ctr may also flow in the driving coil.

Meanwhile, the detector 111 (in FIG. 5) may detect the coil current from which the offset current is removed.

Figure 7:
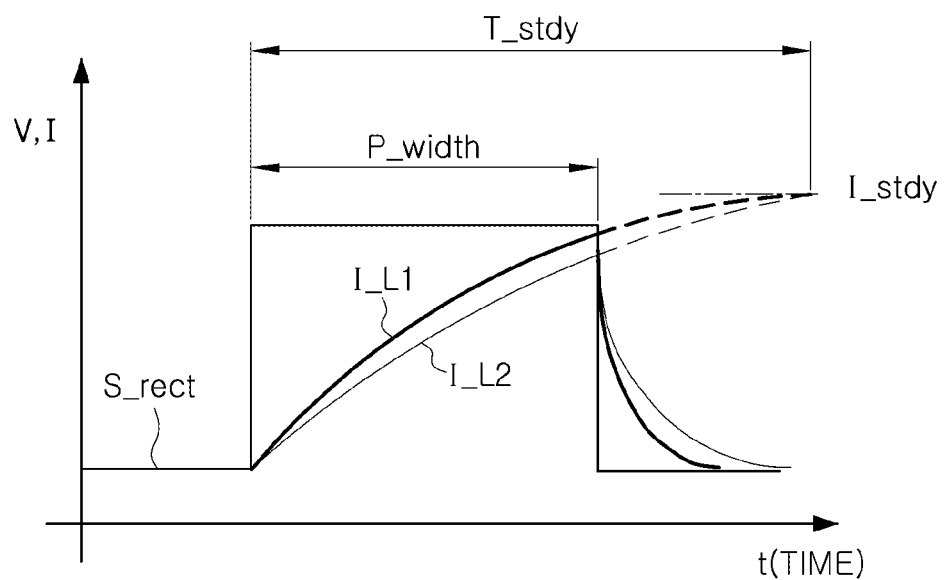
FIG. 7 is a waveform diagram illustrating an example of a reference signal and a coil current.

FIG. 7 is a waveform diagram that illustrates the reference signal and the coil current according to an example of a camera module.

Referring to FIG. 7, an enlarged waveform in one period of the reference signal S_rect applied to the driving coil 131 (in FIG. 5) by the detector 111 (in FIG. 5) may be confirmed. In this example, the reference signal S_rect may be the square wave voltage signal.

Coil currents I_L1 and I_L2 flowing in the driving coil by the reference signal S_rect may have different waveforms based on different levels of inductance of the driving coil.

The detector 111 of the actuator driving apparatus 110 according to the example illustrated in FIG. 5 detects these coil currents and determines the position of the lens carrier based on the detected coil currents.

Meanwhile, when a high level section of the reference signal S_rect is sufficiently long, the coil currents I_L1 and I_L2 may arrive at a steady state, having a constant current value l_stdy in the section.

Therefore, when a pulse width P_width of the reference signal S_rect is higher than a steady-state arrival time T_stdy of the coil current, it may be difficult to accurately detect the inductor current.

In order to accurately detect the coil current, the detector may sense the coil current before the coil current flowing in the driving coil arrives at a steady state.

Alternatively, the pulse width P_width of the reference signal S_rect may be set to be shorter than the steady-state arrival time of the coil current.

As set forth above, according to examples, the actuator driving apparatus and the camera module including the same may determine the position of the lens carrier based on the change in the coil current flowing in the driving coil.

In this example, because a separate position sensor is not required, manufacturing costs may be decreased, and space efficiency may be improved.

The apparatuses, units, modules, devices, and other components illustrated in FIGS. 1-5 are implemented by one or more hardware components. Examples of hardware components include circuits, controllers, sensors, generators, drivers, actuators, brackets, circuit boards, and other hardware components known to one of ordinary skill in the art. In one example, the hardware components are implemented by microprocessor, processor or other computing hardware. A processor or a computing hardware may be implemented by one or more processing elements. In one example, a processor or a computing hardware includes, or is connected to, one or more memories storing instructions or software that are executed by the processor or the computing hardware. For simplicity, the singular term "processor" may be used in the description of the examples described herein, but in other examples multiple processors or computers may be used, or a processor or computing hardware may include multiple processing elements, or multiple types of processing elements, or both. In one example, a hardware component includes multiple processors, and in another example, a hardware component includes a processor and a controller.

The instructions or software may control a processor to perform methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator driving apparatus, comprising:
   a detector configured to apply a reference signal to a driving coil of an actuator and detect a coil current flowing through the driving coil;
   a calculator configured to determine a position of a lens carrier based on the coil current; and
   a driver configured to drive the actuator by applying a control signal to the driving coil to generate a driving force based on the position of the lens carrier and a target position of the lens carrier,
   wherein the detector is configured to detect the coil current from which an offset current of the control signal for driving the actuator is removed,
   wherein the offset current is based on the control signal, and wherein the control signal is transferred from the driver to the detector bypassing the driving coil.

2. The actuator driving apparatus of claim 1, wherein the reference signal is a square wave voltage signal.

3. The actuator driving apparatus of claim 1, wherein the detector is configured to sense the coil current before the coil current is in a steady state.

4. The actuator driving apparatus of claim 1, wherein inductance of the driving coil is changed depending on the position of the lens carrier.

5. The actuator driving apparatus of claim 1, wherein the calculator is configured to calculate inductance of the driving coil based on the coil current, and output position information of the lens carrier corresponding to the inductance to the driver.

6. A camera module comprising:
   a lens carrier disposed in a housing;
   a magnetic body that moves with the lens carrier;
   an actuator comprising a driving coil disposed in the housing to face the magnetic body, the actuator being configured to receive a control signal to move the lens carrier; and
   an actuator driving apparatus configured to drive the actuator,
   wherein the actuator driving apparatus comprises a detector that applies a reference signal to the driving coil and detects a coil current flowing through the driving coil, a calculator that determines a position of the lens carrier based on the coil current, and a driver that drives the actuator by applying a control signal to the driving coil to generate a driving force based on the position of the lens carrier and a target position of the lens carrier,
   wherein the detector detects the coil current from which an offset current of the control signal for driving the actuator is removed,
   wherein the offset current is based on the control signal, and wherein the control signal is transferred from the driver to the detector bypassing the driving coil.

7. The camera module of claim 6, wherein the reference signal is a square wave voltage signal.

8. The camera module of claim 6, wherein the detector is configured to sense the coil current before the coil current is in a steady state.

9. The camera module of claim 6, wherein inductance of the driving coil is changed depending on the position of the lens carrier.

10. The camera module of claim 6, wherein the calculator is configured to calculate inductance of the driving coil based on the coil current, and output position information of the lens carrier corresponding to the inductance to the driver.

11. The camera module of claim 6, wherein the actuator comprises a voice coil motor (VCM).

12. An actuator driving apparatus comprising:
    a detection circuit configured to apply a reference to a driving coil of an actuator and detect a coil current flowing through the driving coil; and
    a driver configured to drive the actuator by outputting an actuator control signal to generate a driving force based on a position of a lens carrier as determined based on the coil current,
    wherein the detection circuit is further configured to receive the actuator control signal from the driver bypassing the driving coil.

13. The actuator driving apparatus of claim 12, further comprising:
    a calculation circuit configured to calculate the position of the lens carrier based on the coil current detected by the detection circuit.

14. The actuator driving apparatus of claim 12, wherein the driver is configured to receive a position control signal from an external source and generate the actuator control signal based on the position of the lens carrier as determined by the coil current and the position control signal.

15. The actuator driving apparatus of claim 12, wherein the detection circuit and the driver comprise a single integrated circuit or two or more integrated circuits.

* * * * *